United States Patent Office 2,788,259
Patented Apr. 9, 1957

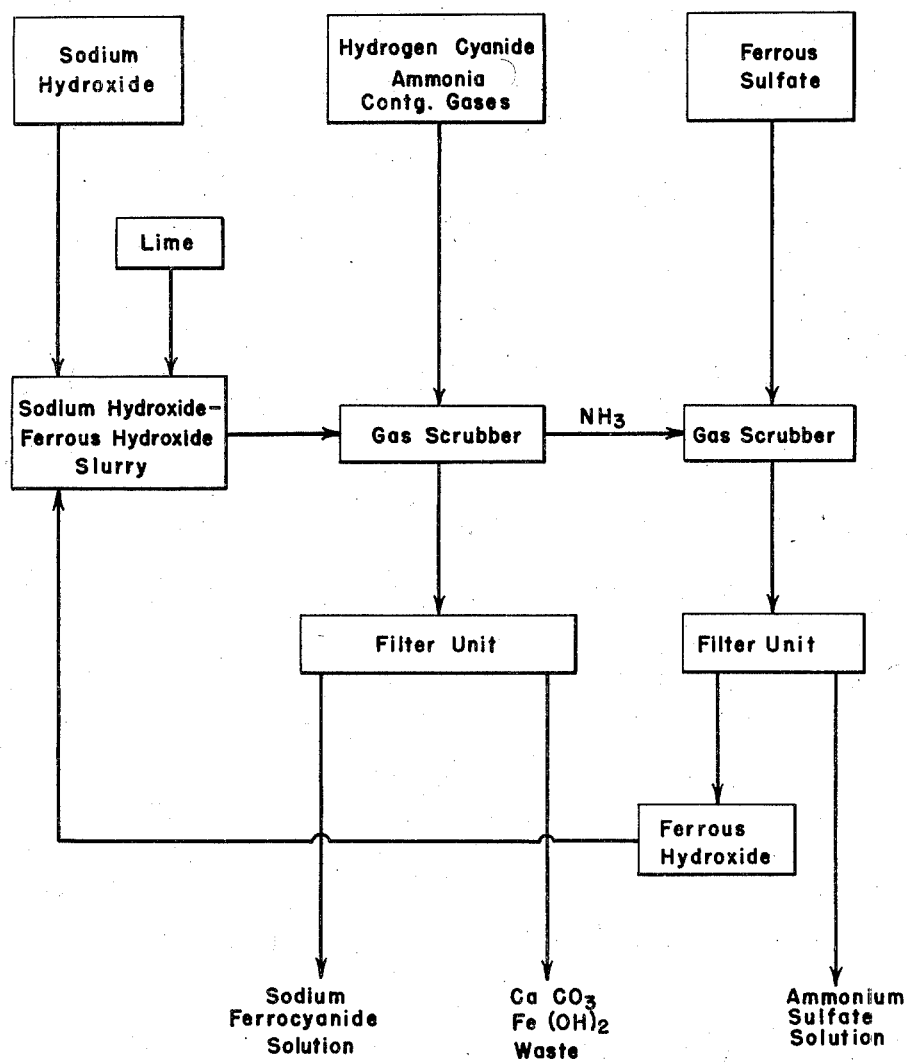

2,788,259

PROCESS FOR PRODUCTION OF ALKALI FERROCYANIDES AND AMMONIUM SULFATE

Alfred E. Van Wirt, Louis J. Gagliano, and Clarence W. Shonnard, Glens Falls, N. Y., assignors to Imperial Paper and Color Corporation, Glens Falls, N. Y., a corporation of New York Application March 15, 1955, Serial No. 494,521

3 Claims. (Cl. 23—76)

This invention relates to the production of alkali metal ferrocyanide by the reaction of hydrogen cyanide with an alkali metal hydroxide and ferrous hydroxide, and ammonium sulfate and ferrous hydroxide by the reaction of ammonia and ferrous sulfate, and has for its object the provision of the direct separate production of alkali metal ferrocyanide and ammonium sulfate from gases containing both hydrogen cyanide (HCN) and ammonia ($NH_3$). More particularly, the invention involves the direct reaction of the HCN in gases containing hydrogen cyanide and ammonia, with an alkali metal hydroxide in solution corresponding to the desired alkali metal ferrocyanide, and a slurry of ferrous hydroxide to effect the direct formation of alkali metal ferrocyanide by inter-action of the hydrogen cyanide, alkali metal hydroxide and ferrous hydroxide and after this, the reaction of the residual ammonia with ferrous sulfate in solution to effect the direct formation of ammonium sulfate and ferrous hydroxide, the ferrous hydroxide being slurried in the solution of alkali metal hydroxide and used in the first reaction.

One of the important aspects of our invention is that we can use the usual hydrogen cyanide production gases made from $NH_3$—$CH_4$ and air and containing relatively low percentages of hydrogen cyanide and ammonia without purification and utilize both the hydrogen cyanide and the ammonia, reducing the amount of alkali ordinarily required in producing ferrocyanide and producing ferrocyanide and ammonium sulfate separately both in forms useful in the manufacture of iron blue pigments in an efficient operation and in relatively simple equipment.

In the reaction of ammonia, methane and air, to produce hydrogen cyanide, the product gas under optimum conditions of operation always contains ammonia associated with hydrogen cyanide. A typical analysis of such gas is as follows:

| | Mol, percent |
|---|---|
| HCN | 5.9 |
| $NH_3$ | 1.6 |
| $CO_2$ | 0.2 |
| CO | 4.4 |
| $CH_4$ | 0.5 |
| $H_2$ | 7.5 |
| $O_2$ | 0.1 |
| $N_2$ | 56.7 |
| $H_2O$ | 23.1 |
| | 100.0 |

Coke oven gas also contains hydrogen cyanide and ammonia along with other gases. This gas contains relatively small amounts of hydrogen cyanide and ammonia along with larger amounts of such gases as nitrogen and carbon dioxide, and has presented problems both in the HCN utilization and the recovery of the valuable ammonia. The latter has usually been accomplished by scrubbing with sulfuric acid to produce ammonium sulfate or absorbing the ammonia in certain solutions, both expensive operations. In the utilization of the HCN to form ferrocyanide by present practices excess reagents are needed, giving rise to relatively useless by-products, such as sodium sulfate ($Na_2SO_4$). Also the presence of appreciable $CO_2$ in the coke-oven gas necessitates absorption of the HCN in alkali carbonate solutions because of the simultaneous absorption of $CO_2$ to give alkali bicarbonate, or to have excess alkali present in the form of NaOH to form with the $CO_2$, sodium carbonate. This concurrent $CO_2$ absorption gives rise to a solution containing relatively large amounts of alkali carbonate along with the ferrocyanide. A fractional crystallization operation to separate the ferrocyanide from the carbonate is, therefore, required to produce pure ferrocyanide.

Our invention using a gas low in $CO_2$ produces pure concentrated alkali ferrocyanide solution directly and utilizes the ammonia in a simple manner, resulting in the production of concentrated ammonium sulfate $$[(NH_4)_2SO_4]$$

solution, which does not have to be purified further for the production of iron blue pigments.

A preferred operation of our process comprises the introduction of a product gas of the aforementioned type into contact with an aqueous slurry of sodium hydroxide and ferrous hydroxide to absorb the hydrogen cyanide, forming the alkali metal ferrocyanide, and then passing the remaining gases into contact with a water solution of ferrous sulfate to absorb the ammonia and form ferrous hydroxide for use in the first operation, and ammonium sulfate [$(NH_4)_2SO_4$]. The reactions of these operations may be represented as follows:

(1) $6HCN + 4NaOH + Fe(OH)_2 = Na_4Fe(CN)_6 + 6H_2O$
(2) $2NH_3 + FeSo_4 + 2H_2O = Fe(OH)_2 + (NH_4)_2SO_4$

Equation 1 readily shows that when the reactants are used in theoretical amounts, the only product resulting is a solution of sodium ferrocyanide. In actual practice, we prefer to use a slight excess of ferrous hydroxide to insure complete reaction. Even so, it is significant that the only processing step necessary is a filtering operation before the ferrocyanide solution is ready for use.

The various reactions or steps of the invention may be carried out batchwise or as an integrated continuous operation.

One important aspect of our invention is that the ammonia necessary for the $Fe(OH)_2$ used in the manufacture of ferrocyanide can be supplied from the gases producing hydrogen cyanide, effecting a saving in the alkali which normally would be required in making $Fe(OH)_2$ from ferrous sulfate.

Although it has been reported that the ammonia present in coke oven gas can be used as the alkali to precipitate $Fe(OH)_2$ from $FeSO_4$ solutions, the system described scrubs the coke oven gas first with water or dilute acid to remove the ammonia as a gas purification step before the HCN absorption and then reacts the $NH_3$ solution or regenerates the ammonia for use as the alkali in a separate step. In our process, using the cleaner gas produced from ammonia and methane, the gas, after removing the HCN, is passed directly through a ferrous sulfate solution thus utilizing the ammonia to form $Fe(OH)_2$ and a solution of $(NH_4)_2SO_4$ in a single step, a major improvement over the above mentioned process using coke oven gas.

While the by-product ammonium sulfate solution can be marketed, or crystallized, if necessary, it is of special value when the solution can be used by the producer since no further processing, other than filtration, is necessary. This is true, for example, when alkali ferrocyanides, such as sodium ferrocyanide, are produced for consumption in the manufacture of iron blue pigments. As is well known, both alkali ferrocyanides and ammonium salts are necessary in iron blue manufacture. Generally, sodium ferrocyanide and ammonium sulfate are chosen because of their low cost. In our process the amount of ammonium sulfate, ferrous hydroxide and sodium ferrocyanide produced from the ammonia-methane reaction to form hydrogen cyanide is close to the amount needed in the process and in the general manufacture of various types of iron blues.

In our preferred process, the ferrous hydroxide is suspended in water to give a slurry with 10 to 20% solids content and is then incorporated into the alkali hydroxide solution. The reaction temperature is preferably held between 80° and 95° C. The pH at the end of the hydrogen cyanide absorption should be between 9.0 and 11.0. This pH, which represents about 5% excess alkali hydroxide, is important for several reasons:

1. The solution must be kept sufficiently alkaline at all times to insure complete absorption of the hydrogen cyanide (over 99% of the hydrogen cyanide is absorbed). If alkali carbonate were used the excess would have to be much greater.

2. It must not be too alkaline at the end of the absorption or the solubility of the sodium ferrocyanide will be lowered so that a concentrated solution cannot be obtained.

The preferred conditions for reacting hydrogen cyanide, sodium hydroxide, and ferrous hydroxide, using the previously mentioned small excess of ferrous hydroxide and sodium hydroxide at temperatures around 90° C., give practically no absorption of ammonia, and we are able to account for about 99% of the hydrogen cyanide in the form of sodium ferrocyanide, proving that cyanide losses due to any reaction with ammonia are negligible under the conditions of our process. That is, most of the ammonia passes through unreacted.

In the second stage of our process for the absorption of ammonia, a temperature of from 25° to 95° C. is preferably used, and when the gas does not contain enough ammonia to complete the reaction to form the necessary amount of $Fe(OH)_2$, some ammonia may be added until all of the $FeSO_4$ is converted to $Fe(OH)_2$ and $(NH_4)_2SO_4$.

When applying our process to the manufacture of sodium ferrocyanide, the solution of sodium ferrocyanide will contain a slight amount of soluble sodium carbonate. The sodium carbonate is formed by the reaction of the sodium hydroxide with the slight amount of carbon dioxide present in the hydrogen cyanide gases, as shown by the analysis given previously.

This sodium carbonate is undesirable for several reasons:

(1) It uses up available NaOH.
(2) It depresses the solubility of the ferrocyanide.
(3) It contaminates the product.

We have found that if some $Ca(OH)_2$ is added to the NaOH—$Fe(OH)_2$ scrubbing solution that all the carbonate is precipitated as $CaCO_3$ which not only eliminates the $Na_2CO_3$ formation, but assists in the filtration of the slight excess of $Fe(OH)_2$ used. This lime treatment can only be economically and conveniently used with gases low in $CO_2$ such as the product gases of the ammonia-methane reaction which we are using.

The accompanying drawing is a flow-sheet illustrating the preferred operating procedure of our invention, when using sodium hydroxide as the alkali metal hydroxide and ferrous sulfate.

The following examples illustrate operations carried out in accordance with our invention, in which the gas was similar to that of the foregoing analysis, the mol ratio of hydrogen cyanide to ammonia being about 3.69 and the mol ratio of hydrogen cyanide to water being about 0.255:

*Example I.—Batch process*

Dissolve 69.4 pounds of sodium hydroxide in 540 pounds of water. Circulate the solution through a scrubbing tower, and heat it to 80–95° C. Then add slowly during the course of the run 195 pounds of 20% ferrous hydroxide slurry, previously prepared from a reaction of ferrous sulfate and ammonia, and lime equivalent to the $CO_2$ in the gas. This slow addition helps to keep the viscosity of the liquid low for easier handling. Hold the temperature during the course of the reaction. External cooling will be necessary once the reaction is started. Start the passage of the ammonia and hydrogen cyanide containing gas, reacting a total of 15,100 s. c. f. gas. The rate of the reaction should be adjusted so that no hydrogen cyanide escapes the scrubbing system. After the reaction, the slurry will consist of about 20% sodium ferrocyanide solution, close to 0.7% sodium hydroxide (this exact excess is not important), about 5% of ferrous hydroxide, based on the starting weight, and the $CaCO_3$. Continue the digestion of this slurry for at least one-half hour or until it becomes easily filterable. Filter, wash and discard the slight amount of excess ferrous hydroxide and $CaCO_3$. The filtered ferrocyanide solution is of sufficient purity to produce standard grade iron blue pigments without further purification or concentration.

The gas leaving the hydrogen cyanide scrubber will contain over 90% of the ammonia found in the starting gas, that is, about 11.5 pounds. This gas is carried to the next scrubbing system and allowed to react with a circulating solution of ferrous sulfate, containing the equivalent of 115 pounds $FeSO_4.7H_2O$. The temperature of this solution can vary from 25–95° C. When using a 20% solution of $FeSO_4.7H_2O$, about a 10% solution of ammonium sulfate will result, containing close to 54.5 pounds of ammonium sulfate. Since the ammonia found in the reacting gas may be insufficient to complete the reaction with ferrous sulfate, additional ammonia can be supplied as anhydrous or aqueous ammonia. After sufficient digestion for proper filtering, the ferrous hydroxide precipitate and ammonium sulfate solution are separated in any convenient manner. The ferrous hydroxide is reslurried with water to 20% concentration and used in the hydrogen cyanide scrubber unit.

Yield: 1,000 pounds 20% $Na_4Fe(CN)_6.10H_2O$ soln.
545 pounds 10% $(NH_4)_2SO_4$ soln.

*Example II.—Continuous process*

Prepare sodium hydroxide-ferrous hydroxide slurry in a ratio of 1 part sodium hydroxide, 0.562 part ferrous hydroxide, and the stoichiometric amount of lime, and 10 parts water by weight, and bring the temperature to 80–95° C. React this slurry continuously with the gases containing hydrogen cyanide and ammonia, so that the pH of the reaction product slurry is held within the limits 9.0–11.0. The ratio of reactants is close to 19 s. c. f. of reacting gas per pound of sodium hydroxide-ferrous hydroxide slurry. Deliver continuously the reacted slurry to a receiver tank in which additional processing can be done, such as minor adjustments of pH, digestion, and then separate the excess $Fe(OH)_2$ and $CaCO_3$ from the sodium ferrocyanide solution. The above reactants will produce approximately a 20% solution of sodium ferrocyanide.

Conduct the off-gases from the hydrogen cyanide scrubber unit to another unit and allow the gases to react continuously with 20% $FeSO_4.7H_2O$ solution (other concentrations can also be used) at any convenient temperature (25–90° C.), passing the ferrous sulfate solution at a rate so that the discharged slurry has a pH close to 8 at 25° C. Under these conditions, most of the ferrous sulfate is converted to ferrous hydroxide.

Conduct the reacted slurry to a receiver tank where additional ammonia can be added in any convenient manner as anhydrous or aqueous ammonia, to complete the precipitation of ferrous hydroxide.

After separation of ferrous hydroxide and ammonium sulfate, by filtration, the ferrous hydroxide is ready for use in the hydrogen cyanide scrubber unit. It should be noted that the amount of $(NH_4)_2SO_4$ produced is roughly equivalent to that required in the manufacture of iron blue pigments, so that the by-products can all be essentially used up in further processing.

The equipment for contacting the gases with the solutions can be any of the usual type of gas absorption apparatus, such as spray towers, packed towers, agitated tanks or venturi scrubbers. The filters may be any of the usual types such as plate and frame, continuous rotary, centrifugal or the like.

This application is a continuation-in-part of our application Serial No. 417,282, filed March 19, 1954, now abandoned.

We claim:

1. The process of producing alkali metal ferrocyanide and ammonium sulfate which comprises reacting the product gas of the ammonia, methane and air reaction containing hydrogen cyanide and ammonia and a small amount of carbon dioxide with an aqueous slurry of alkali metal hydrogen, ferrous hydroxide produced in the process and lime, to form with the hydrogen cyanide the alkali metal ferrocyanide in solution and with the carbon dioxide to form calcium carbonate, separating from the solution any residual ferrous hydroxide and the calcium carbonate leaving in the solution sodium ferrocyanide, and then passing the remaining gas containing ammonia into contact with an aqueous solution of ferrous sulfate to form ammonium sulfate and the ferrous hydroxide used in the preceding reaction.

2. In the process of claim 1 using sodium hydroxide as the alkali metal hydroxide.

3. In the process of claim 1, using potassium hydroxide as the alkali metal hydroxide.

References Cited in the file of this patent

UNITED STATES PATENTS

| | | |
|---|---|---|
| 2,415,792 | Gravell | Feb. 11, 1947 |

FOREIGN PATENTS

| | | |
|---|---|---|
| 109,254 | Great Britain | July 25, 1918 |
| 349,692 | Great Britain | June 4, 1931 |

OTHER REFERENCES

Williams: The Chemistry of Cyanogen Compounds, 1915, p. 241. J. & A. Churchill, London.

Jacobson: Encyclopedia of Chemical Reactions, vol. 2, 1948, p. 126.